United States Patent [19]

Lindblad

[11] 4,421,442
[45] Dec. 20, 1983

[54] DOWELING JIG

[76] Inventor: Cyril M. Lindblad, 1533 East Ave., Napa, Calif. 94558

[21] Appl. No.: 319,469

[22] Filed: Nov. 9, 1981

[51] Int. Cl.³ .................. B23B 47/28; B23B 45/14
[52] U.S. Cl. ......................... 408/115 R; 408/108
[58] Field of Search ............... 408/72, 103, 105, 108, 408/115 R, 115 B; 33/42, 185 R, 189; 269/87.3, 219, 243; 279/67

[56] References Cited

U.S. PATENT DOCUMENTS

| | | | |
|---|---|---|---|
| 580,273 | 4/1897 | Grier | 408/103 |
| 2,556,131 | 6/1951 | Wolfson | 408/103 |
| 2,710,454 | 6/1955 | Kershaw | 408/115 |
| 2,740,308 | 3/1956 | Blanchard | 408/72 |
| 2,783,665 | 3/1957 | Saunders | 408/108 |
| 3,674,376 | 7/1972 | Silken | 408/115 R |
| 3,708,237 | 1/1973 | Kruse | 408/115 R |
| 3,918,165 | 11/1975 | Czernik et al. | 408/115 R |
| 4,145,160 | 3/1979 | Wiggins | 408/115 R |

FOREIGN PATENT DOCUMENTS

| | | | |
|---|---|---|---|
| 463820 | 8/1928 | Fed. Rep. of Germany | 27/62 |
| 1437759 | 6/1976 | United Kingdom | 408/115 |

Primary Examiner—E. R. Kazenske
Assistant Examiner—Paul M. Heyrana, Sr.
Attorney, Agent, or Firm—Rankin A. Milliken

[57] ABSTRACT

A clamp-type doweling jig is disclosed which comprises two clamping jaw and drill guide assemblies, each of these assemblies having a clamping face and a drill guide which is immovable with respect to the clamping face.

3 Claims, 5 Drawing Figures

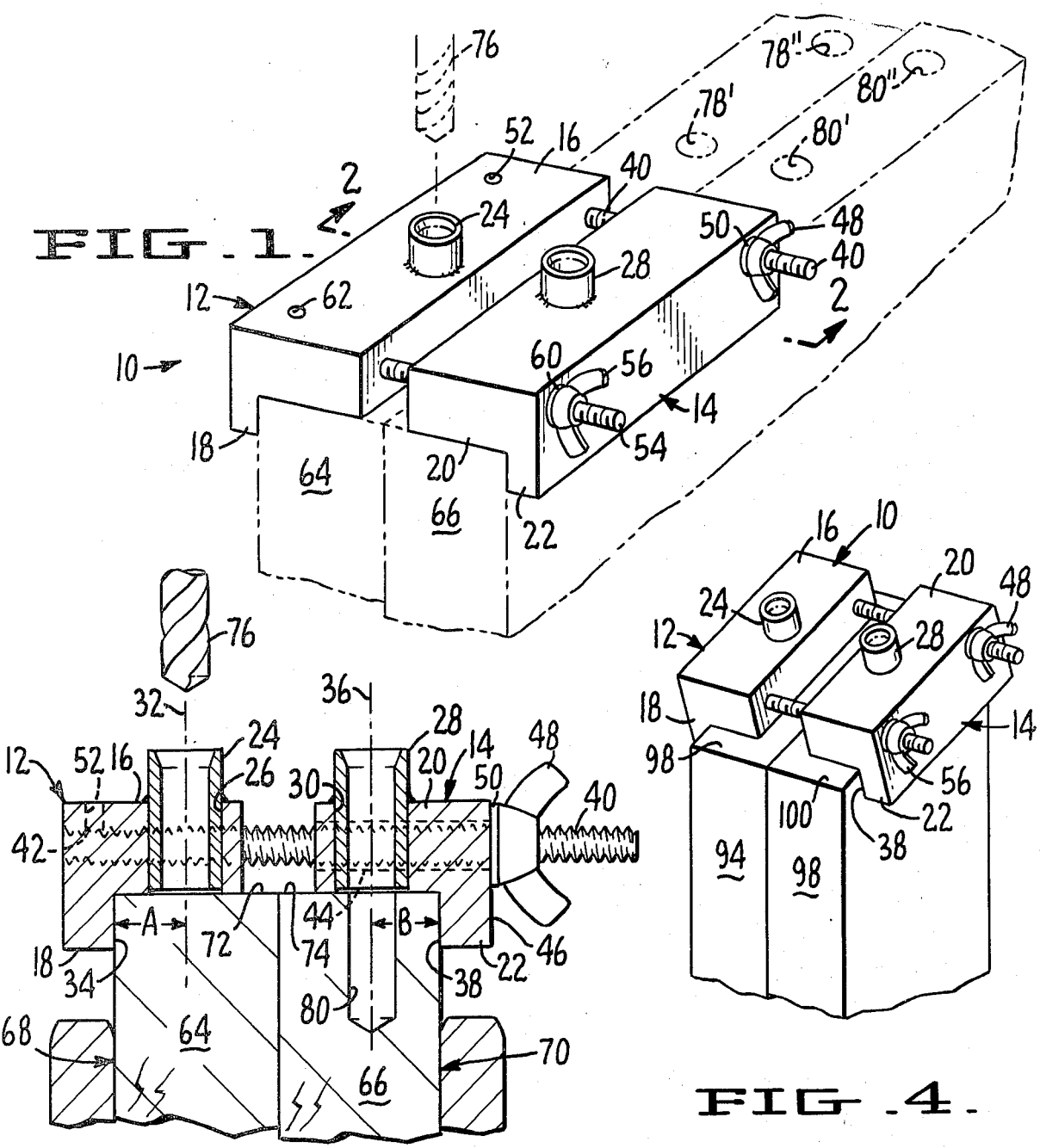
FIG. 1.
FIG. 2.
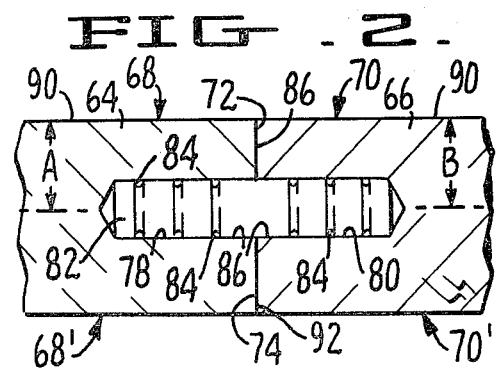
FIG. 3.
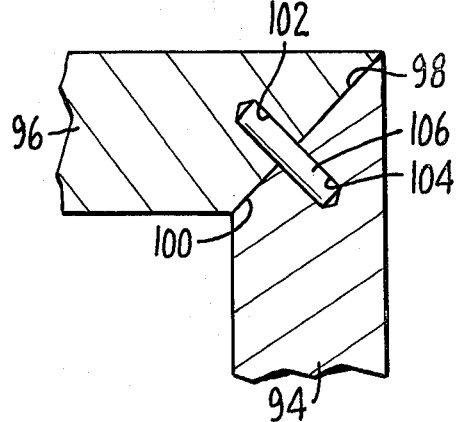
FIG. 4.
FIG. 5.

DOWELING JIG

BACKGROUND OF THE INVENTION

1. Field of the Invention

My invention relates to doweling jigs or boring jigs, and more particularly to doweling jigs of the type adapted to be clamped to the adjoined edges of boards to be joined by doweling.

2. Description of the Prior Art.

The term "prior art" as used herein and in documents relating hereto means only that the document referred to as constituting part of the prior art has an effective date earlier than the date of filing hereof, and has no other connotation. The prior art includes clamp-type doweling jigs adapted to be clamped to the adjoined edges of boards which are to be joined by doweling, such as those shown and described in U.S. Pat. Nos. 2,556,131; 3,674,376; and 3,708,237. The prior art also includes multi-stage doweling jigs, such as that of U.S. Pat. No. 4,093,394; and multi-purpose doweling jigs, such as the doweling jig of U.S. Pat. No. 2,260,784.

As may be seen from the above-cited clamp-type doweling jig patents, however, the clamp-type doweling jigs of the prior art generally constitute a clamp assembly and one or more separate drill guide assemblies which are mounted or mountable on the clamp assembly. These prior art doweling jigs are generally comprised of a number of individual parts, such as clamping or positioning screws, drill guide carrying rails, etc., the provision of each of which adds to the cost of the complete jig, and thus puts such a jig out of the practical economic reach of the home craftsman who has a limited use therefor.

Further, these prior art clamp-type doweling jigs require that the drill guide or guides be positioned as a part of each use of the jig, generally by making measurements of the thickness of the boards to be joined, and then positioning the drill guide or drill guides on the clamping assembly in accordance with those measurements.

Yet further, some of these prior art clamp-type doweling jigs include separate or easily separable parts, such as set screws, wing nuts, or bolts which can easily be lost and are at the least a nuisance to replace, or can be replaced only by the time-consuming process of writing to the manufacturer, etc., if indeed they are available at all at the time of loss.

SUMMARY OF THE INVENTION

Accordingly, it is an object of my invention to provide a novel doweling jig the use of which is much more rapid and efficient than the use of the doweling jigs of the prior art.

It is aother object of my invention to provide a novel doweling jig the use of which involves the making of no measurements whatsoever.

It is a further object of my invention to provide a novel clamp-type doweling jig the use of which does not involve any adjustment of the positions of the drill guides with respect to the other parts of the jig.

Yet another object of my invention is to provide a novel doweling jig which is comprised of less parts than the doweling jigs of the prior art.

A still further object of my invention is to provide a novel doweling jig which can easily be made unitary, so that no parts thereof can be lost therefrom.

An additional object of my invention is to provide a novel doweling jig the cost of which is within the practical economic reach of even the infrequent user.

In accordance with a principal aspect of my invention, a novel doweling jig comprises two unitary clamping jaw and drill guide assemblies, each of which comprises a clamping face and a drill guide which is fixably positioned with respect thereto.

In accordance with a second principal aspect of my invention, a novel doweling jig is provided which comprises two substantially identical jaw and drill guide assemblies.

In accordance with yet another principal aspect of my invention, a novel clamp-type doweling jig is provided in which the only adjustment possible is the adjustment of the distance between the clamping faces which press against the boards to be clamped when the jig is in use.

Other objects and aspects of my invention will in part be obvious and will in part appear hereinafter.

My invention accordingly, comprises the features of construction, combinations of elements, and arrangements of parts which will be exemplified in the construction hereinafter set forth, and the scope of my invention will be indicated in the appended claims.

For a fuller understanding of the nature and objects of my invention, reference should be had to the following detailed description, taken in connection with the accompanying drawings.

BRIEF DESCRIPTION OF THE DRAWINGS

FIG. 1 is a perspective view of a doweling jig embodying my invention being used to drill the dowel-receiving holes in the edges of two boards or planks which are to be joined by means of a dowelled butt joint;

FIG. 2 is a sectional view of the doweling jig and boards of FIG. 1, taken along line 2—2 of FIG. 1;

FIG. 3 is a partial sectional view of the boards shown in FIG. 1, after the completion of the dowelled butt joint therebetween;

FIG. 4 is a perspective view of a doweling jig embodying my invention, as used to drill the dowel-receiving holes of a dowelled miter joint; and FIG. 5 shows the completed dowelled miter joint the drilling of the dowel-receiving holes of which is illustrated in FIG. 4.

DESCRIPTION OF THE PREFERRED EMBODIMENT

Referring now to FIG. 1, there is shown a doweling jig 10 which constitutes a preferred embodiment of my invention.

Doweling jig 10 comprises a first jaw assembly 12 and a second jaw assembly 14.

Jaw assembly 12 comprises a body portion 16 and a flange or jaw portion 18 which projects from body portion 16 and is integral therewith. Similarly, jaw assembly 4 comprises a body portion 20 and a flange or jaw portion 22 which projects from body portion 20 and is integral therewith.

As best seen in FIG. 2, jaw assembly 12 further comprises a drill guide bushing 24 which is closely-fittingly received in a bore 26 in body portion 16, and is affixed therein, e.g., by brazing. Similarly, body assembly 14 further comprises a drill guide bushing 28 which is close-fittingly received in a bore 30 in body portion 20, and is affixed therein, e.g., by brazing.

In accordance with the principles of my invention, the minimum distance between the axis 32 of drill guide bushing 24 and the inner face 34 of jaw portion 18 of jaw assembly 12, designated as A in FIG. 2, is fixed in any particular embodiment of my invention. Similarly, the minimum distance between the axis 36 of drill guide bushing 28 and the inner face 38 of jaw portion 22 of jaw assembly 14, designated as B in FIG. 2, is fixed in any particular embodiment of my invention.

Further, in accordance with the principles of my invention, the distance A is equal to the distance B in any particular embodiment of my invention.

As best seen in FIG. 2, a threaded shaft 40 is received in and engaged with a tapped hole 42 in body portion 16 of jaw assembly 12.

As also best seen in FIG. 2, threaded shaft 40 passes through a clearance hole 44 in body portion 20 of jaw assembly 14, and extends well beyond the common outer face 46 of body portion 20 and jaw portion 22 of jaw assembly 14. Threaded shaft 40 is provided with a wing nut 48, and a cooperating washer 50.

In the preferred embodiment of my invention threaded shaft 40 is permanently affixed to jaw assembly 12 by means of a suitable tool, which is passed through bore 52 in the upper face of jaw assembly 12 and then used to locally upset the threads of threaded shaft 40, and then withdrawn from bore 52. Other methods and means of permanently affixing threaded shaft 40 in jaw assembly 12 will be supplied by those having ordinary skill in the art without the exercise of invention.

Further, in the preferred embodiment of my invention, wing nut 48 is trapped on threaded shaft 40 by upsetting a few of the outermost (leftmost in FIG. 2) threads of threaded shaft 40.

Similarly, threaded shaft 54 (FIG. 1) is received in and engaged with a tapped hole (not shown) in body portion 16 of jaw assembly 12, and threaded shaft 54 passes through a clearance hole (not shown) in body portion 20 of jaw assembly 14, and extends well beyond the common outer face 46 of body portion 20 and body portion 22 of jaw assembly 14. Threaded shaft 54 is provided with a wing nut 56 and a cooperating washer 60. In the preferred embodiment of my invention threaded shaft 54 is permanently affixed to jaw assembly 12 by means of a suitable tool, which is passed through bore 62 in the upper face of jaw assembly 12 and then used to locally upset the threads of threaded shaft 54, and then withdrawn from bore 62. Other methods and means of permanently affixing threaded shaft 54 in jaw assembly 12 will be supplied by those having ordinary skill in the art without the exercise of invention. Further, in the preferred embodiment of my invention, wing nut 56 is trapped on threaded shaft 54 by upsetting a few of the outermost (leftmost in FIG. 1) threads of threaded shaft 54.

In making use of the doweling jig 10 of the preferred embodiment of my invention in drilling corresponding pairs of dowel receiving holes or bores in the two edges of two boards 64, 66, these two boards are first clamped together by clamping means 67, etc., of well-known type, so that their preferred or better faces 68, 70, (FIG. 2) are not in contact, but rather are remote from each other, as seen in FIG. 2. (In making the usual dowelled joint, boards 64, 66 will, of course, be clamped in longitudinal registration, i.e., in registration in the direction perpendicular to the plane of FIG. 2.)

The doweling jig 10 of the preferred embodiment is then clamped to boards 64, 66 as seen in FIG. 2, so that the drill guide bushings 24, 28 are immediately juxtaposed to the edges 72, 74 of the boards 64, 66 which are to be joined, and are respectively equidistant from the better faces 68, 70, of boards 64, 66 by the equal distances A, B, shown in FIG. 2.

After doweling jig 10 is clamped to the edges of boards 64 and 66, as seen in FIG. 2, a drill bit 76, which is mounted in the chuck of an electrically powered drill, is passed through drill guide bushing 24 and into the edge of board 64, to provide a suitably located dowel receiving hole 78 (FIG. 3), and is then passed through drill guide bushing 28 and into the edge of board 66, to provide a suitably located dowel receiving bore or hole 80 (FIG. 3).

Doweling jig 10 is then unclamped, moved to a new location along the same edges of boards 64, 66, and reclamped to boards 64, 66 for the purpose of drilling the pair of dowel receiving holes 78', 80', (FIG. 1); unclamped, moved to a second new location along the same edges of boards 64, 66 for the purpose of drilling the pair of dowel receiving holes 78", 80"; etc; until a suitable number of pairs of dowel receiving bores or holes is provided along said edges of boards 64, 66. In accordance with a particular feature of the method of my invention, the pairs of dowel receiving holes 78, 80; 78', 80'; 78", 80"; etc.; need only be spaced by eye, and it is not necessary to make a measurement each time doweling jig 10 is relocated along said edges of boards 64, 66.

Referring now to FIG. 3, it will be seen that a suitable dowel 82 is fully engaged in dowel receiving holes 78 and 80, dowel 82 being provided with glue receiving grooves 82 in the well-known manner. Also in the well-known manner, suitable dowels 82', 82", etc., are also engaged in cooperating hole pairs 78', 80'; 78", 80"; etc. Dowels 82, 82', 82", etc.; and the abutting edges 72, 74 of boards 64 and 66 are, of course, first provided with a common coat of suitable wood glue 86 in the well-known manner. The boards 64, 66 are then preferably clamped together in the well-known manner until said wood glue is set, and thus a doweled joint is provided between boards 64 and 66 by means of the method and apparatus of my invention. It is to be particularly noted that, as seen in FIG. 2, the better faces 68, 70 of these boards are perfectly registered, so as to present a single, continuous, smooth face 90 on one side of the joined boards, even though the unequal thicknesses of boards 64, 66 results in a gap 92 between the opposite faces 68', 70' thereof.

Referring now to FIG. 4, it will be seen that the doweling jig 10 of my invention can also be used in providing the dowel receiving holes or bores in dowelled mitre joints. In FIG. 4 there are shown two boards 94, 96. Board 94 is provided with a 45° mitre edge 98; and board 96 is provided with a 45° mitre edge 100.

In using the doweling jig of the preferred embodiment of my invention to provide registered dowel receiving holes in mitred edges 98, 100, boards 94, 96 are first clamped together by well-known clamping means (not shown), so that the adjacent faces of the two boards 94, 96 are in registration as shown in FIG. 4. Doweling jig 10 is then clamped to the clamped boards in such manner that substantially the entire inner faces 34 and 38 of jaw portions 18 and 22 clampingly engage the mitred ends of the clamped boards 94, 96, and the body portions 16 and 20 of jaw assemblies 12 and 14 bear upon the mitred edges, i.e., ends, of boards 94, 96. After doweling jig 10 has thus been securely clamped to boards 94 and 96 by means of wing nuts 48, 56, etc., a drill of suitable diameter can be passed through drill guide bushings 24 and 28, respectively, to provide suitable registered dowel receiving bores or holes 102, 104 (FIG. 5).

As will be apparent to those having ordinary skill in the art, informed by the present disclosure, doweling jig 10 may be clamped to boards 94, 96 at two places spaced along mitred edges 98, 100 for the purpose of providing two registered dowel receiving bores in mitred faces 98, 100, and, since the pairs of holes thus provided will both be registered, it will not be necessary to make any measurements for the positioning of doweling jig 10 in its two corresponding positions. Thus, it will be seen that the doweling jig of my invention eliminates the need for making any measurements at all when drilling dowel receiving bores or holes in mitred board edges.

Referring now to FIG. 5, there is shown in cross-section the registered bores 102, 104, in the completed, dowelled mitred joint between boards 94 and 96, and dowel 106 glued therein in the well-known manner.

Many other applications of the doweling jig of my invention will now occur to those having ordinary skill in the art, informed by the present disclosure.

It will thus be seen that the objects set forth above, among those made apparent from the preceding description, are efficiently attained, and, since certain changes may be made in the above construction without departing from the scope of my invention, it is intended that all matter contained in the above description, or shown in the accompanying drawings, shall be interpreted as illustrative only, and not in a limiting sense.

It is also to be understood that the following claims are intended to cover all of the generic and specific features of my invention herein described, and all statements of the scope of my invention which, as a matter of language, might be said to fall therebetween.

Having described my invention, what I claim as new and desire to secure by Letters Patent is:

1. A doweling jig, comprising:
   a first jaw assembly comprising a first work clamping face and a first drill guide the axis of which is fixedly positioned at a predetermined distance from said first work clamping face;
   a second jaw assembly comprising a second work clamping face and a second drill guide the axis of which is fixedly positioned at a predetermined distance from said second work clamping face; and
   screw means associated with said jaw assemblies for maintaining said first and second work clamping faces substantially parallel to each other and maintaining said drill guide axes between said work clamping faces and substantially parallel to said work clamping faces, and for drawing said work clamping faces together so as to clamp together in side-by-side relation two work pieces which are to be joined by a dowel joint, whereby holes drilled by a bit passing through said drill guides when said work pieces are thus clamped in side-by-side relation are aligned axially for receiving a dowel when said work pieces are abutted edge-to-edge.

2. A doweling jig as claimed in claim 1 in which said screw means comprises two threaded shafts each of which is fixed in one of said jaw assemblies and passes through a clearance bore in the other, and internally threaded tightening means engaged with the threads of each of said threaded shafts for urging said work clamping faces toward each other against said side-by-side work pieces.

3. A doweling jig as claimed in claim 2 in which each of said work clamping faces is a face of a flange projecting from and integral with a body member, and each of said drill guides is fixed in one of said body members.

* * * * *